US011614611B2

(12) United States Patent
Stoppe et al.

(10) Patent No.: US 11,614,611 B2
(45) Date of Patent: Mar. 28, 2023

(54) SEGMENTED OPTICAL SYSTEM FOR A LIGHTING MODULE FOR ANGLE-RESOLVED ILLUMINATION

(71) Applicant: Carl Zeiss Microscopy GmbH, Jena (DE)

(72) Inventors: Lars Stoppe, Jena (DE); Matthias Hillenbrand, Jena (DE); Uwe Wolf, Magdala (DE); Gerhard Krampert, Pleasanton, CA (US)

(73) Assignee: Carl Zeiss Microscopy GmbH, Jena (DE)

( * ) Notice: Subject to any disclaimer, the term of this patent is extended or adjusted under 35 U.S.C. 154(b) by 344 days.

(21) Appl. No.: 16/469,566

(22) PCT Filed: Dec. 18, 2017

(86) PCT No.: PCT/EP2017/083248
§ 371 (c)(1),
(2) Date: Jun. 13, 2019

(87) PCT Pub. No.: WO2018/109226
PCT Pub. Date: Jun. 21, 2018

(65) Prior Publication Data
US 2019/0391377 A1 Dec. 26, 2019

(30) Foreign Application Priority Data

Dec. 16, 2016 (DE) ..................... 10 2016 124 612.3

(51) Int. Cl.
*G02B 21/12* (2006.01)
*G02B 21/08* (2006.01)
(Continued)

(52) U.S. Cl.
CPC ......... *G02B 21/125* (2013.01); *G02B 21/088* (2013.01); *G02B 3/0006* (2013.01); *G02B 5/045* (2013.01)

(58) Field of Classification Search
CPC .... G02B 21/06; G02B 21/0076; G02B 21/16; G02B 21/0032; G02B 21/367;
(Continued)

(56) References Cited

U.S. PATENT DOCUMENTS 4,852,985 A   8/1989  Fujihara et al.
5,690,417 A * 11/1997  Polidor ............... G02B 21/084
                                                       359/387

(Continued)

FOREIGN PATENT DOCUMENTS

CN    105209956 A    12/2015
CN    105700124 A     6/2016
(Continued)

OTHER PUBLICATIONS

International Search Report with English language translation, International Application No. PCT/EP2017/083248, dated Aug. 3, 2018, 11 pp.
(Continued)

*Primary Examiner* — William R Alexander
*Assistant Examiner* — Sharrief I Broome
(74) *Attorney, Agent, or Firm* — Myers Bigel, P.A.

(57) ABSTRACT

An illumination module (101) for an optical apparatus comprises a light source unit (102), which is configured to selectively emit light along a multiplicity of beam paths (112) in each case. The illumination module (101) also comprises a multiplicity of optical elements (201-203) arranged with lateral offset from one another, wherein each optical element (201-203) of the multiplicity of optical elements (201-203) is configured to transform at least one
(Continued)

corresponding beam path (112) of the multiplicity of beam paths.

21 Claims, 10 Drawing Sheets

(51) Int. Cl.
 *G02B 3/00* (2006.01)
 *G02B 5/04* (2006.01)
(58) Field of Classification Search
 CPC .... G02B 21/26; G02B 21/008; G02B 21/361; G02B 27/58; G02B 21/14; G02B 21/0048; G02B 21/025; G02B 21/34; G02B 21/0072; G02B 21/08; G02B 21/24; G02B 21/365; G02B 21/002; G02B 21/0044; G02B 21/02; G01N 21/6458; G01N 2021/6463; G01N 2021/6478; G01N 2201/06113; G01N 2021/6419; G01N 2021/6421; G01N 2021/6441; G01N 21/6428; G01N 21/6456; G01N 2201/10; G01N 1/2806; G01N 1/2813; G01N 1/30; G01N 2001/282; G01N 2001/2826; G01N 2001/302; G01N 2021/0396; G01N 2021/135; G01N 2021/1785; G01N 2021/392; A61B 1/00096; A61B 1/00188; A61B 1/043; A61B 10/02; A61B 1/00009; A61B 1/0005; A61B 1/00172; A61B 1/0638; A61B 1/07; A61B 1/3132; A61B 2090/366; A61B 2090/3941; A61B 5/0064; A61B 5/0071; A61B 5/0077; A61B 5/441; A61B 5/449; A61B 5/6898
 See application file for complete search history.

(56) References Cited

U.S. PATENT DOCUMENTS

| | | | | |
|---|---|---|---|---|
| 6,384,968 | B1* | 5/2002 | Ito | G02B 7/20 |
| | | | | 359/385 |
| 2002/0024986 | A1* | 2/2002 | Arisawa | H01S 3/30 |
| | | | | 372/75 |
| 2002/0171825 | A1* | 11/2002 | Krantz | G01N 21/95607 |
| | | | | 356/237.1 |
| 2003/0165011 | A1 | 9/2003 | Tandler et al. | |
| 2005/0285129 | A1 | 12/2005 | Jackson et al. | |
| 2007/0242363 | A1* | 10/2007 | Noboru | G02B 27/108 |
| | | | | 359/618 |
| 2009/0224694 | A1* | 9/2009 | Horing | G02B 21/06 |
| | | | | 315/295 |
| 2010/0085635 | A1* | 4/2010 | Verboven | G01N 21/87 |
| | | | | 359/382 |
| 2011/0321204 | A1* | 12/2011 | Karaki | G01Q 60/22 |
| | | | | 850/32 |
| 2013/0077159 | A1* | 3/2013 | Tani | G02B 21/125 |
| | | | | 359/387 |
| 2014/0043527 | A1* | 2/2014 | Lu | G06V 40/1324 |
| | | | | 348/E5.034 |
| 2014/0085623 | A1* | 3/2014 | Lorbeer | G01B 9/02091 |
| | | | | 356/51 |
| 2015/0070757 | A1 | 3/2015 | Lippert et al. | |
| 2015/0116833 | A1* | 4/2015 | Boyd | G02B 5/0236 |
| | | | | 359/599 |
| 2016/0005566 | A1* | 1/2016 | Zewail | H01J 37/26 |
| | | | | 250/311 |
| 2016/0048011 | A1 | 2/2016 | Suzuki et al. | |
| 2017/0192217 | A1* | 7/2017 | Fukuyama | G02B 27/0068 |

FOREIGN PATENT DOCUMENTS

| | | | | |
|---|---|---|---|---|
| DE | 3734691 | A1 | 4/1988 | |
| DE | 19653234 | A1 | 11/1997 | |
| DE | 19919096 | A1 | 11/2000 | |
| DE | 69909252 | T2 | 5/2004 | |
| DE | 102005029119 | A1 | 12/2006 | |
| DE | 102012210876 | A1 | 1/2014 | |
| DE | 102014109687 | A1 | 1/2016 | |
| DE | 102014112242 | A1 | 3/2016 | |
| DE | 102015105613 | A1 | 10/2016 | |
| DE | 102016200157 | A1 | 7/2017 | |
| EP | 1566847 | A1 * | 8/2005 | ............. H04N 9/315 |
| EP | 1566847 | A1 | 8/2005 | |

OTHER PUBLICATIONS

Written Opinion of the International Searching Authority, International Application No. PCT/EP2017/083248, dated Aug. 3, 2018, 9 pp.

"Second Office Action and English language translation", CN Application No. 201780086239.7, dated Jun. 23, 2021, 5 pp.

* cited by examiner

SEGMENTED OPTICAL SYSTEM FOR A LIGHTING MODULE FOR ANGLE-RESOLVED ILLUMINATION

CROSS REFERENCE TO RELATED APPLICATIONS

This application is a 35 U.S.C. § 371 national stage application of PCT International Application No. PCT/EP2017/083248, filed on Dec. 18, 2017, which itself claims the benefit of and priority to German Application No. 10 2016 124 612.3, filed Dec. 16, 2016, the disclosure and content of both of which are incorporated by reference herein in their entireties.

TECHNICAL FIELD

Various embodiments of the invention relate, in general, to an illumination module for an optical apparatus. By way of example, the illumination module can be configured for angle-selective illumination from different illumination directions. According to various examples, the illumination module comprises, in particular, a multiplicity of optical elements, each configured to transform at least one corresponding beam path.

BACKGROUND

DE 10 2014 112 242 A1 has disclosed techniques for illuminating a specimen from different illumination directions (angle-selective illumination or structured illumination or angle-resolved illumination). It is possible to determine a result image by combining the images obtained for the different illumination directions, said result image having a phase contrast, for example. Thus, digital post-processing may allow phase contrast imaging by means of the angle-selective illumination.

DE 10 2014 109 687 A1 has also disclosed techniques relating to angle-resolved illumination. Techniques are described therein in order to determine the position of a specimen object in relation to a focal plane of an optical apparatus on the basis of the angle-resolved illumination. As a result, autofocus applications can be facilitated.

In order to implement an angle-resolved illumination, it may be necessary to selectively emit light along different beam paths of a multiplicity of beam paths. Here, the different beam paths may correspond to the various illumination directions.

A corresponding illumination module for angle-resolved illumination, which uses a common optical unit for the multiplicity of beam paths, may be particularly complicated. By way of example, this relates to an implementation on the basis of a Köhler illumination system. A common optical unit can be complicated, particularly when using large angles between the different beam paths. If no optical unit is used at all, this may lead to an uncontrolled alignment of the specimen space; moreover, the light efficiency in the region of the specimen object may be limited.

BRIEF DESCRIPTION OF THE INVENTION

Therefore, there is a need for improved illumination modules for angle-resolved illumination. In particular, there is a need for illumination modules which reduce or eliminate at least some of the aforementioned disadvantages and limitations.

This object is achieved by the features of the independent patent claims. The features of the dependent patent claims define embodiments.

In one example, an illumination module for an optical apparatus, in particular a microscope, comprises a light source unit. The light source unit is configured to selectively emit light along a multiplicity of beam paths in each case. The illumination module also comprises a multiplicity of optical elements which, for example, may be arranged with lateral offset from one another. Each optical element of the multiplicity of optical elements is configured in each case to transform at least one corresponding beam path of the multiplicity of beam paths.

By way of example, it would be possible for the transformation of the beam paths to comprise focusing or collimation. In general, it may be possible for the transformation of the beam paths to contain influencing of the spatial distribution and/or the angle distribution of a respective beam path. As an alternative or in addition thereto, the transformation of the beam paths could also contain a modification of the lateral intensity distribution or phase distribution of a respective beam path. By way of example, the beam paths can be transformed coherently: a plurality of beam paths could be switched together in order to produce an interference pattern.

The light source unit may comprise at least one carrier and a multiplicity of light sources. Examples for a carrier comprise a printed circuit board or a wafer substrate, such as, e.g., silicon or another semiconductor material. Here, the various light sources of the multiplicity of light sources can be separately actuatable. This may mean that individual light sources of the multiplicity of light sources can be individually switched on or off or, in general, the power thereof can be adapted individually.

The light sources are attached to the at least one carrier. By way of example, the light sources can be arranged on the surface of the at least one carrier. In further examples, it would also be possible for the light sources to be embedded in the at least one carrier, for example if the latter has a transparent embodiment. By way of example, the light sources can be arranged in depressions or bores in a surface of the at least one carrier.

In the various examples described herein, the illumination module could serve to illuminate a specimen object in transmitted light geometry. However, use in reflected-light geometry would also be possible in some examples.

In various examples described herein, it is possible for the illumination module to be configured for bright-field imaging of the microscope. This may mean that beam paths are also emitted by the light source unit close to the principal axis of the microscope and/or at a small angle in relation to the principal axis. This means that light sources are typically arranged close to or on the principal axis in corresponding implementations. This may distinguish the corresponding illumination modules from ring illumination modules, in particular, which have a hole at their center such that light reflected directly from a specimen object can pass through a detector aperture, which is aligned on the hole.

Thus, in this context, it would be possible for the real space density of light sources in the corresponding region of the at least one carrier to not vary, or not vary particularly strongly, as a function of the lateral position—i.e., perpendicular to the principal axis. Typically, the real space density is described by the number of light sources per unit area. The real space density may correlate with a distance between closest-neighbor light sources. By way of example, the real space density can be defined in 1D or 2D, i.e., along a line or within a possibly curved area.

Since no light sources are present within a hole of ring illumination modules, the real space density of the light sources within a perimeter of ring illumination modules varies strongly. The real space density equals zero in the region of the hole.

In particular it would be possible for the real space density of the light sources within the perimeter of the region of the at least one carrier, in which substantially all light sources are arranged, to not vary by more than 50%, optionally by no more than 30%, further optionally by no more than 10%. By way of example, it would be possible for no less than 90%, optionally no less than 95%, further optionally 100%, of all the light sources of the illumination module to lie within this region. Such an embodiment of the illumination module without a hole has the advantage that bright-field imaging through the microscope is facilitated with beam paths arranged near or on the principal axis, which can pass directly—i.e., without scattering at the specimen object—through the detector aperture.

By way of example, the region could be defined as an area within which the light sources lie. If the light sources are attached to the surface of the at least one carrier, for example, then the region can be defined along the surface.

In the various examples described herein, it would be possible, as a matter of principle, for one or more optical elements to have an axially offset arrangement for each beam path. Expressed differently, it is not necessary for only a single optical element of the multiplicity of optical elements to be present in each beam path. By way of example, this would allow a plurality of lenses or different types of optical elements to be combined sequentially.

The specific application of the illumination module is not limited in respect of an optical apparatus. By way of example, the illumination module described herein could be employed in an optical microscope or in a laser scanning microscope. By way of example, the illumination module described herein could be used in conjunction with fluorescence imaging. Here, it would be possible, for example, for the illumination module to be arranged in reflected-light geometry or transmitted-light geometry in relation to the specimen object.

By way of example, the illumination module could be configured for the angle-resolved illumination of a specimen object arranged on a specimen holder of the optical apparatus. Here, the different beam paths can be assigned to different illumination directions in relation to the specimen object. This means that a first beam path can correspond to a first illumination direction and a second beam path can correspond to a second illumination direction, with the first illumination direction differing from the second illumination direction. By way of example, the beam paths could cover an angle range with respect to an optical principal axis of the optical apparatus that is no less than 45°, optionally no less than 75°, further optionally no less than 85°. In this way, it is also possible to achieve particularly oblique illumination directions with respect to the optical principal axis. Such a scenario is also referred to as angle-resolved illumination.

In order to implement the angle-resolved illumination, the illumination module is configured to selectively emit the light along the multiplicity of beam paths in each case. This means that channels corresponding to the individual beam paths of the multiplicity of beam paths can be selectively actuated. Expressed differently, it may be possible to emit light along a first beam path of the multiplicity of beam paths and not emit light along a second beam path of the multi-plicity of beam paths. By way of example, individual beam paths can be activated in time-sequential fashion.

Use can be made of different techniques in order to achieve such a selective addressing of different beam paths. By way of example, it would be possible for the light source unit to comprise a multiplicity of light sources that can be actuated separately. This means that a control unit can transmit individual control signals to the different light sources such that these either emit light or else do not emit light.

Examples of such light sources include: light-emitting diodes; laser diodes; organic light-emitting diodes; solid-state light-emitting diodes; light-emitting diode arrays, for example with different color channels that are integrated on a common substrate; multi-quadrant light-emitting diodes, such as four-quadrant light-emitting diodes, for example; surface emitters (vertical-cavity surface-emitting laser; VCSEL); fiber-coupled lighting fixtures, for example laser diodes that feed the light into a fiber by way of a fiber coupler. By way of example, a common lighting fixture could be optically coupled in selective fashion to one or more fibers of a multiplicity of fibers by way of a switchable fiber coupler. These fibers can then be led away from the fiber coupler as a fanned open bundle such that the fiber ends are arranged at discrete lateral positions—for example, defined by a corresponding carrier of the light source unit. In this way, the end surfaces of the fibers can act as discrete light sources. A particularly densely packed arrangement of different light sources can be achieved in this way. Moreover, use can be made of a particularly efficient lighting fixture in order to produce the light.

By way of example, it would be possible for 3-chip light-emitting diodes to be used as light sources. Here, a plurality of light-emitting diodes, for example a total of three light-emitting diodes, can be integrated together on a substrate. By way of example, it would be possible for the light-emitting diodes integrated together on a substrate to emit light with different colors, for example corresponding to the red, green and blue channels. What can be achieved thereby is that, in addition to different illumination directions, different colors can also be used to illuminate the specimen. By way of example, this may have advantages in relation to specimen objects with a sensitivity to certain wavelengths. Moreover, this may render it possible to carry out the angle-resolved illumination parallel in time with a conventional illumination in which different wavelengths are used. Such techniques may not be possible or only possible to a restricted extent using conventional white-light light-emitting diodes, for example on a phosphor basis. However, as a result of the spatial separation of the various color channels, spatially offset illumination directions or distributions of the light field in the specimen space are typically also obtained in corresponding fashion. Should this offset be desired, this offset of the corresponding beam paths can be reduced by exploiting chromatic aberrations in combination with a suitable alignment of the corresponding lighting fixture—for example, a suitable rotation.

As an alternative to a plurality of light-emitting diodes integrated on a common substrate, it is also possible to use separate light-emitting diodes with different wavelengths that are situated on different substrates. Here it would also be possible, in particular, for different optical elements to be assigned to the different light-emitting diodes, which have different wavelengths. In such an example, it would also be possible for the optical elements assigned to the different light-emitting diodes with different wavelengths to have different beam shaping properties. Specifically, what can be achieved thereby is that the different optical elements are matched particularly well to the spectral properties of the different light sources.

In other examples, it would be possible for the light source unit to comprise a laser scanner configured to selectively and—for example, depending on scanning angle or lateral scanning position—emit light along a corresponding beam path of the multiplicity of beam paths. By way of example, this can mean that the laser scanner monitors what scanning angle or what scanning position is implemented and then, depending on the scanning angle or the scanning position, activates or switches off the lighting fixture. The laser scanner could be operated in resonant or static fashion. By way of example, the light source unit could also be implemented by one or more mechanically displaceable light sources. To this end, use can be made, for example, of a movable stage or an XY-positioning system. By way of example, mechanically displaceable light sources could be implemented, in particular, in conjunction with the aforementioned fiber-coupled lighting fixtures. The fiber ends could be displaced in the process; this is possible on account of the elasticity of the fibers.

In a further example, the light source unit could also be implemented as an extensively illuminated stop area with a displaceable position of the stop aperture. However, what should be taken into account here is that the majority of the light is lost by irradiating the stop area, and so the efficiency may be reduced.

It would also be possible in some examples for the various aforementioned examples for the implementation of the light source unit to be combined with one another. By way of example, the light source unit could be implemented by one or more groups of a laser light source with a laser scanner and, optionally, a diffusion screen for widening the various beam paths. As an alternative or in addition thereto, it would also be possible for the light source unit to be implemented by a group or a plurality of groups of a laser light source, a laser scanner and a transparent substrate with a phosphor film.

In general, the light source unit could comprise one or more diffusion screens, with the one diffusion screen or the plurality of diffusion screens being configured to widen the beam paths, i.e., increase the diameter of the beam paths. By way of example, the diffusion screen could be implemented by a plexiglass panel with a certain surface roughness.

In general, the light source unit could also comprise a transparent substrate with a phosphor film. By way of example, use can be made of a blue light-emitting diode with a phosphor film; the phosphor film may have luminescence over a large spectral range. The phosphor film can be excited to emit light in a spatially resolved fashion—for example, by a laser scanner—and can thus define different light sources.

By way of example, a large area substrate could be provided with a phosphor film. By way of example, the latter could then be illuminated by a blue light-emitting diode in order thus to excite luminescence. By way of example, the beam path could be transformed: here, the blue light-emitting diode can produce a beam path which is subsequently transformed and then illuminates the phosphor film, for example with a cruciform or rectangular illumination pattern. As a result, it is possible to obtain a light source with a certain lateral intensity distribution that emits over a large spectral range.

Here, in general, the phosphor can be used not only as a film but, for example, can be distributed in a volume. By way of example, this may be the case with phosphor plates.

The multiplicity of optical elements can define a segmented optical unit. Different segments of the segmented optical unit can be assigned to different beam paths in this case. It may be possible for one or more beam paths to be assigned to each segment of the segmented optical unit. It would also be possible for each segment of the segmented optical unit to be assigned to at least one corresponding beam path.

By way of example, it would be possible for the optical elements of the multiplicity of optical elements to each be configured to transform no more than ten beam paths, optionally no more than four beam paths, further optionally no more than a single beam path of the multiplicity of beam paths.

By way of example, it would be possible for the optical elements of the multiplicity of optical elements to each be configured to transform no more than 10% of the beam paths, optionally no more than 4% of the beam paths, further optionally no more than 1% of the beam paths of the multiplicity of beam paths.

Different types of transformation of the beam paths are conceivable. By way of example, a beam path could be transformed in such a way that the latter has a certain divergence even after the transformation, i.e., a widening of the cross section of the beam path for relatively large distances from the light source. This may be desirable, in particular, for specimen objects that themselves are larger than the optical elements. Here, the various optical elements may have positive refractive power such that the divergence is reduced by the transformation.

By contrast, in cases where the illuminated specimen region is smaller than the aperture of the individual optical element, focusing with a positive focal length to form a convergent beam could be desirable. Here, the focal plane can be arranged in front of or behind the specimen object. Typically, use can be made of a converging optical unit. A collimation—for example using an optical unit with a positive refractive power, in which the light source is situated in the focal plane—may be desirable if the illuminated specimen region corresponds to the aperture of the respective optical element.

Here, different implementations for the segmented optical unit or the multiplicity of optical elements are conceivable. By way of example, the multiplicity of optical elements could implement a free-form array, which comprises, for example, a prism surface and a free-form surface. A further example would be the implementation of a diffractive element by the multiplicity of optical elements. By way of example, the optical elements could be embodied as lenses. By way of example, use could be made of a segmented diffractive element with a multiplicity of diffractive sub-functions. In conjunction with light sources implemented by fiber end surfaces of a fiber-coupled lighting fixture, it would be possible, for example, for the lenses to be implemented as gradient index lenses (GRIN lenses) or as spherical lenses. Deflection prisms could be directly placed thereon. A further example for the segmented optical unit comprises separate prism and lens arrays. An even further example for the segmented optical unit comprises a holographic element with sub-holograms. The various sub-holograms could be produced, for example, by multiple exposure and, in particular, by separate exposure processes. To this end, a suitable polymer can be linked and/or rearranged during an exposure process, for example, such that there is a local change in the refractive index. By way of example, it would be possible for various sub-holograms to laterally overlap and thus direct a particularly large component of the beam path provided by the light source onto the specimen object.

What can be achieved by using the multiplicity of optical elements is that each individual optical element can have comparatively small dimensions. This may particularly apply in comparison with a whole-area optical unit, in which a single optical element implements the transformation of the multiplicity of beam paths. Specifically, it may typically be necessary within the scope of the angle-resolved illumination for a comparatively large number of beam paths to be subjected to appropriate beam shaping. Moreover, the multiplicity of beam paths covering a comparatively large solid angle may be necessary in the case of the angle-resolved illumination. Therefore, beam shaping by means of a single whole-area optical unit may be complicated. It may also be possible for the whole-area optical unit to be implemented in comparatively complicated fashion and with a multiplicity of lenses passed through by the beam paths in sequence, for example. In such an example, it may be possible that the achievable etendue is limited. However, as a result of using the multiplicity of optical elements, which are each assigned to one or more beam paths, the individual optical element can be implemented in tailored fashion with respect to the associated beam path or beam paths. As a result, it is possible to implement a system in turn, which requires little installation space and which can transport a large etendue. At the same time, it is possible to implement a system that can be produced in little complicated and cost-effective fashion. A particularly large lateral extent can be achieved with the same thickness of the system, as a result of which, for example, a comparatively large number of beam paths can be transformed.

By way of example, it would be possible for different optical elements to have different beam shaping properties. By way of example, those optical elements which are assigned to beam paths arranged further away from the optical principal axis of the optical apparatus could effect stronger or weaker focusing than those optical elements which are assigned to beam paths arranged closer to the optical principal axis of the optical apparatus. Expressed differently, there can thus be a variation of the distance to the virtual image between different optical elements of the multiplicity of optical elements; this can compensate the different distance from the specimen object for different optical elements or light sources of the light source unit. Therefore, it may be possible for different optical elements to implement different geometric forms for one or more optically effective refractive surfaces.

Thus, in general, the multiplicity of optical elements can effect beam shaping of the various beam paths. Here, focusing and collimation are examples of this beam shaping. Optionally, it would also be possible for the multiplicity of optical elements to effect a deflection for at least some beam paths. Expressed differently, at least some optical elements of the multiplicity of optical elements could be configured in each case to deflect the corresponding at least one beam path.

By implementing the deflection of at least some of the beam paths, it is possible to implement different illumination directions. By way of example, the deflection angle for beam paths situated further away from the optical principal axis of the optical apparatus could be greater than for beam paths lying closer to the optical principal axis. Here, the light can be deflected in such a way that all beam paths of the multiplicity of beam paths are steered onto a specimen region of the optical apparatus. This can ensure an illumination of the specimen region within the scope of the angle-resolved illumination.

What can be achieved by the common implementation of the transformation or beam shaping—i.e., for example, focusing or collimation—and the deflection by the multiplicity of optical elements is that the illumination module is implemented in a particularly space-saving manner. Moreover, complicated positioning of light sources of the light source unit can be avoided because the deflection need not be implemented by the orientation of the light sources.

By way of example, at least some optical elements could form a deflection unit such as a prism or a mirror, for example. By way of example, the multiplicity of optical elements could form a prism array with a plurality of prisms, wherein different prisms are assigned to different beam paths.

By way of example, it would be possible for the multiplicity of optical elements to form a lens array with a plurality of lenses, wherein different lenses are assigned to different beam paths.

By way of example, the lens array could also be referred to as a microlens array. This may be the case since, in contrast to a whole-area optical unit, individual lenses only shape a comparatively restricted number of beam paths, which may be associated with different illumination directions.

In some examples, it may be possible for the multiplicity of optical elements to be embodied as an integral part, i.e., for these to be monolithically integrated. By way of example, it would be possible for the integral part to be produced by means of 3D printing or an injection molding method. It would also be possible for the integral part to be produced by means of a manufacturing method for a diffractive optical unit or by means of a holographic manufacturing method. It would also be possible, in some examples, for groups of optical elements to be combined in each case from the multiplicity of optical elements and to form an integral part in each case. This means that more than one single integral part may be present. In this way it would be possible, for example, for more than an individual array to be implemented, e.g., a total of 2-5 arrays. Here, in various examples, a multiplicity of arrays can also be formed by the multiplicity of optical elements. This means that the optical overall effect of the segmented optical unit may be distributed among a plurality of arrays in various examples. What this can achieve is that imaging aberrations and/or the tension of the optical system are reduced. Moreover, it may be possible to implement larger deflection angles.

However, in other examples, the multiplicity of optical elements could also be implemented by a multiplicity of parts, with the various parts being interconnected by way of a frame structure, for example. In this way, the various optical elements could be implemented by parts with comparatively small dimensions, which may simplify the production.

The implementation of a segmented optical unit comprising the multiplicity of optical elements does not preclude a continued optional use of a whole-area optical unit. By way of example, the whole-area optical unit could influence the multiplicity of beam paths together. This means that the whole-area optical unit may have a lateral extent that is large enough to be passed through by all beam paths of the multiplicity of beam paths.

By way of example, the illumination module could furthermore comprise a whole-area lens arranged in front of or behind the multiplicity of optical elements in the multiplicity of beam paths. By way of example, examples of such a whole-area lens comprise a refractive lens and a diffractive lens.

A whole-area lens, too, can implement a segmented optical unit. An example would lie in the use of a Fresnel lens with a plurality of ring zones as whole-area lens. Here, different ring zones can be assigned to different beam paths of the multiplicity of beam paths. In particular, a Fresnel lens can implement the deflection functionality. By way of example, the different ring zones can have different thicknesses and/or define steps (zigzag pattern).

By way of example, the surface of the at least one carrier could be planar. By way of example, in such a case, the light sources could be configured to each emit light along the multiplicity of beam paths that are oriented parallel to one another. However, it would also be possible for the surface of the at least one carrier to be curved. In such a case, different light sources can also be arranged at a certain angle with respect to one another. What can be achieved in such a case is that the light sources are configured to each emit light along the multiplicity of beam paths that are not oriented parallel to one another. By way of example, it would be possible for the surface of the at least one carrier to be curved toward a principal axis of the optical apparatus. In such an example, the deflection functionality can be implemented at least in part by the curvature of the surface of the at least one carrier. Then, it may be dispensable in at least some examples for the multiplicity of optical elements to also provide a deflection functionality.

If the carrier has a surface with a curvature, the various light sources may all be arranged at the same angles in relation to the surface of the carrier—for example, in relation to the local surface normal—but non-parallel beam paths can nevertheless be emitted by the multiplicity of light sources. Optionally, or in addition thereto, it would also be possible for the light sources to be arranged at different angles on the surface of the at least one carrier. In such an example, non-parallel beam paths can be obtained by varying the orientation of the light sources with respect to the surface of the at least one carrier. By way of example, holders could be provided which, depending on the light source, implement different orientations of the light source with respect to the carrier. By way of example, it would be possible for the carrier to be implemented as a base plate with oblique bores, wherein fibers are inserted into the bores as optical waveguides in each case or wherein light-emitting diodes are inserted therein. Then, the different bores can have different angles with respect to a surface normal of the carrier, for example. A further example would lie in the provision of a base plate as a carrier, with the base plate having oblique stop surfaces for substrates, on which solid-state light-emitting diodes are implemented. Such solutions can facilitate particularly small dimensions of the light source unit.

It would be possible, in some examples, for all light sources to be arranged on a single carrier. However, in further examples, it would also be possible for a plurality of carriers, for example carriers with comparatively small dimensions, to be used instead of a single carrier. By way of example, it would be possible for the various carriers not to be oriented parallel to one another but instead to be tilted with respect to one another. This means that different carriers can have different orientations with respect to one another. In such an example, the deflection functionality can be implemented at least in part by the tilt of the surfaces of the plurality of carriers. Then, it may be dispensable in at least some examples for the multiplicity of optical elements to also provide a deflection functionality.

By way of example, it would be possible for the light sources of the multiplicity of light sources arranged on the surfaces of different carriers to be associated with optical elements of the multiplicity of optical elements that are assigned to different integral parts. As already explained above, it may be possible, specifically, for at least some of the multiplicity of optical elements to be embodied as an integral part. Then, the integral part or the plurality of integral parts can each define optical arrays. Thus, it would be possible in this context for a plurality of small arrays of light sources, which have different orientations with respect to one another, to be also defined by the use of the plurality of carriers. Then, it may be possible for a respectively assigned integral part with appropriate optical elements to be provided for each array of light sources. This may facilitate a comparatively simple implementation of the multiplicity of optical elements. However, in other examples, it would also be possible for a common integral part of optical elements to be used for all arrays of light sources. Using such an approach, it is possible to realize particularly large angles for different illumination directions.

By way of example, the illumination module could comprise a multiplicity of field stops. Here, the field stops could be assigned to different beam paths. By way of example, it would be possible for the multiplicity of field stops to be arranged in the beam paths upstream or downstream of the multiplicity of optical elements. By way of example, it would be possible for the multiplicity of field stops to be arranged adjacent to light sources of the light source unit. Specifically, the light sources can emit the light along divergent beam paths, for example, and so crosstalk between different beam paths can be avoided by the multiplicity of field stops. By way of example, this can, in turn, avoid extraneous light being guided outside of the illumination region provided for the specimen.

By way of example, it would be possible for at least some optical elements of the multiplicity of optical elements to be arranged off-centered in each case with respect to a central ray of the corresponding at least one beam path. This means that a lateral offset may be present between the openings of different lenses, which implement different optical elements, in relation to the respective light source. As a result, particularly good matching to the respective beam path can be implemented and the efficiency can be increased. The etendue in the region of the specimen object can be increased.

By way of example, the different light sources of the light source unit could form a lattice structure. To this end, it may be possible, for example, for the individual optical elements to have a form that is matched to the form of the unit cell of the lattice structure. By way of example, it could be possible for the optical elements to form a hexagonal lattice; then it would be possible to implement the optical elements as hexagonal lenses or prisms. By way of example, other channel forms comprise: square, orthogonal or rectangular. Different rotational positions of a corresponding lattice can also be implemented.

In particular, it would be possible, for example, for the lattice structure of the multiplicity of optical elements to be matched to a lattice structure formed by the multiplicity of light sources of the light source unit. Specifically, the light sources of the light source unit could form a lattice structure with a certain unit cell, for example; this unit cell could then also be implemented by the lattice structure formed by the multiplicity of optical elements. What this can achieve is that a particularly large light output per light source is collected and shaped by the respective optical element of the multiplicity of optical elements. Specifically, the aperture of the optical elements is matched to the structure of the individual light sources in this case. As a result, the etendue in the region of the specimen object can be increased.

The illumination module may also comprise a condenser optical unit in some examples. Here, the multiplicity of optical elements can be arranged between the light source unit and the condenser optical unit. This can facilitate a particularly homogenous illumination from the different illumination directions.

In one example, the microscope comprises the illumination module according to a further example. By way of example, the microscope could be an optical microscope or a laser scanning microscope. By way of example, the microscope could facilitate fluorescence imaging.

Further, the microscope can comprise a detector. The microscope can also comprise a specimen holder.

By way of example, it would be possible for the illumination module and the detector to be arranged on the same side of the specimen holder such that a reflected-light geometry is implemented. Here, light is reflected by a specimen object arranged on the specimen holder and said light is then incident on the detector. By way of example, a beam splitter could be provided to this end, said beam splitter mirroring-in the light coming from the illumination module.

In other examples, it would also be possible for the illumination module and the detector to be arranged on different sides of the specimen holder, i.e., for the specimen holder to be arranged between the illumination module and the detector. In this way, it is possible to implement a transmitted-light geometry. Here, light passes through the at least partly transparent specimen object arranged on the specimen holder and said light is then incident on the detector.

In the various scenarios described herein, it is possible for a geometric arrangement of at least some beam paths of the multiplicity of beam paths, along which light is emitted by the light source unit, to be configured for bright-field imaging of the microscope. This means that light of the corresponding beam paths can directly reach the detector from the light source unit, i.e., without scattering, and is not rejected by a detector field stop. In particular, the provision of beam paths emitted by the light source unit close and at a small angle with respect to the principal axis of the microscope can contribute to this end. In particular light sources being arranged close to the center of a surface of the carrier of the illumination module can contribute to this end, this typically not being the case for ring illumination modules—which have a central hole.

The geometric arrangement of at least some beam paths of the multiplicity of beam paths also can be configured for dark-field imaging of the microscope in addition or as an alternative to bright-field imaging of the microscope. This means that corresponding light can only by way of suitable scattering reach the detector from the light source unit without being rejected by the detector field stop. In particular, the provision of beam paths emitted by the light source unit further away from the principal axis of the microscope can contribute to this end.

By way of example, scenarios are conceivable in which light sources are arranged near the center of the surface of the carrier of the illumination module and light sources that are arranged further away from the center of the surface of the carrier of the illumination module are provided. Then, the central light sources or the associated beam paths can be used for bright-field imaging and the off-centered light sources or the associated beam paths can be used for dark-field imaging.

In one example, a method for operating an illumination module for an optical apparatus comprises the actuation of a light source unit of the illumination module in order to selectively emit light along a multiplicity of beam paths in each case. The method also comprises transforming the multiplicity of beam paths by means of a multiplicity of optical elements, e.g., arranged with a lateral offset, of the illumination module. Each optical element of the multiplicity of optical elements is configured in each case to transform at least one corresponding beam path of the multiplicity of beam paths.

For such a method for operating an illumination module, it is possible to achieve effects that are comparable to the effects that can be achieved for an illumination module in accordance with a further example.

In one further example, a method for operating a microscope comprises the actuation of a light source unit of an illumination module of the microscope in order to selectively emit light along a multiplicity of beam paths in each case.

By way of example, the method for operating the illumination module according to the currently discussed example could be carried out by the illumination module according to a further example. The method also comprises transforming the multiplicity of beam paths by means of a multiplicity of optical elements arranged with a lateral offset of the illumination module. Each optical element is configured in each case to transform at least one corresponding beam path of the multiplicity of beam paths. The method moreover comprises the actuation of a detector of the microscope to carry out imaging by means of the light that is emitted along the at least one beam path of the multiplicity of beam paths. Here, the light source unit can be actuated for bright-field imaging of the detector.

That is to say, one or more suitable light sources of the light source unit can be activated such that light is emitted along those beam paths that are arranged in the bright field of a detector aperture of the detector.

As an alternative or in addition thereto, the light source unit can also be actuated for bright-field imaging of the detector. That is to say, one or more suitable light sources of the light source unit can be activated such that light is emitted along those beam paths that are arranged in the dark field of a detector aperture of the detector.

For such a method for operating a microscope, it is possible to achieve effects that are comparable to the effects that can be achieved for a microscope in accordance with a further example.

The features set out above and features that are described below may be used not only in the corresponding combinations explicitly set out, but also in further combinations or in isolation, without departing from the scope of protection of the present invention.

BRIEF DESCRIPTION OF THE FIGURES

FIG. 14 schematically illustrates the shaping of light by a single optical element of the segmented optical unit according to various examples, wherein FIG. 14 represents the focusing with a positive focal length and residual divergence.

FIG. 15 schematically illustrates the shaping of light by a single optical element of the segmented optical unit according to various examples, wherein FIG. 15 represents the collimation.

FIG. 16 schematically illustrates the shaping of light by a single optical element of the segmented optical unit according to various examples, wherein FIG. 16 represents the focusing with a positive focal length and convergence.

DETAILED DESCRIPTION OF EMBODIMENTS

Figure 1:
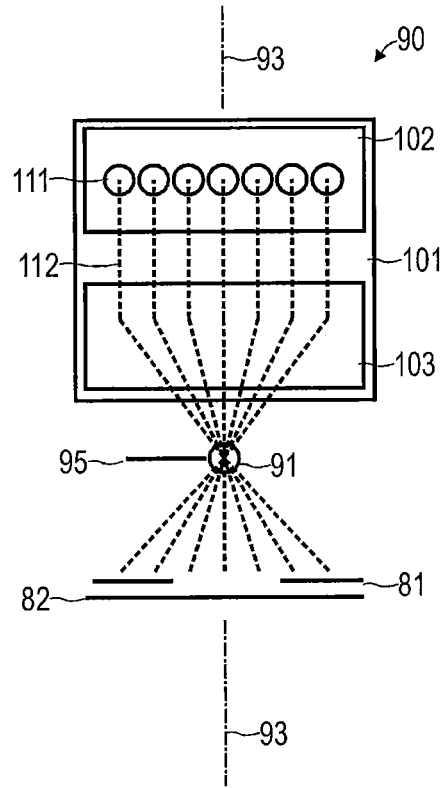
FIG. 1 schematically illustrates an illumination module for an optical apparatus according to various examples.

The properties, features and advantages of this invention described above and the way in which they are achieved will become clearer and more clearly comprehensible in association with the following description of the exemplary embodiments which are explained in greater detail in association with the drawings.

The present invention is explained in greater detail below on the basis of preferred embodiments with reference to the drawings. In the figures, identical reference signs designate identical or similar elements. The figures are schematic representations of different embodiments of the invention. Elements illustrated in the figures are not necessarily depicted as true to scale. Rather, the different elements illustrated in the figures are reproduced in such a way that their function and general purpose become comprehensible to the person skilled in the art. Connections and couplings between functional units and elements as illustrated in the figures may also be implemented as an indirect connection or coupling. A connection or coupling may be implemented in a wired or wireless manner. Functional units may be implemented as hardware, software or a combination of hardware and software.

Below, techniques are described in relation to an illumination module, which can be used for the angle-resolved illumination of a specimen object. Here, the illumination module may have a segmented optical unit with a plurality of segments, wherein different segments may effect different shaping of beam paths of light. By way of example, different segments can transform the light differently. By way of example, different segments can deflect the light differently.

By way of example, the angle-resolved illumination can be used in conjunction with determining the position of the specimen object in relation to a focal plane. As an alternative or in addition thereto, the angle-resolved illumination could be used to produce a phase contrast image of the specimen object.

If the angle-resolved illumination is used in conjunction with determining the position of the specimen object, it may be possible to determine the distance between the imaging location of the specimen object in two images that are associated with different illumination directions. Hence, focusing of the specimen object can be facilitated.

In order to carry out such techniques for producing a phase contrast image or for determining the position of the specimen object, it would be possible, for example, to use a correspondingly configured computing unit. In particular, a corresponding optical apparatus could have such a computing unit such that images recorded by the optical apparatus can be post-processed and/or evaluated digitally by the computing unit. Therefore, the techniques described herein are also sometimes referred to as digitally enhanced imaging.

If the angle-resolved illumination is used to produce a phase contrast image of the specimen object, it may be possible to combine two images of the specimen object, which two images are associated with different illumination directions. As a result, a result image having the phase contrast is obtained. This functionality, too, can be implemented by the computing unit. Autofocus applications can also be facilitated.

Here, the different illumination directions can be implemented by using different beam paths of light. This means that it may be possible to selectively emit or not emit the light for different beam paths in order to activate or deactivate individual illumination directions. To this end, use can be made of separately switchable light sources of a corresponding light source unit, for example. These light sources can be implemented by one or more lighting fixtures. Use could also be made of a laser scanner, with light selectively being emitted or not emitted along the corresponding beam path; then, only a single lighting fixture or a small number of lighting fixtures are necessary.

FIG. 1 illustrates aspects in relation to an optical apparatus 90. By way of example, the optical apparatus 90 could be a microscope or a laser scanning microscope. The optical apparatus could have an objective optical unit (not illustrated). The optical apparatus could have an eyepiece (not illustrated).

The optical apparatus 90 comprises a detector 82 and an associated detector aperture 81. By way of example, the optical apparatus could have a camera as detector 82. The optical apparatus could have an illumination source in addition to an illumination module 102.

The optical apparatus 90 comprises a specimen stage or a specimen holder 95, on which a specimen object 91 is arranged. By way of example, the specimen object 91 can be arranged in the vicinity of or in the focal plane of the optical apparatus 90. FIG. 1 further illustrates the optical principal axis 93 of the optical apparatus 90 (dashed-dotted line in FIG. 1).

The optical apparatus 90 also comprises an illumination module 101. The illumination module 101 serves to selectively illuminate the specimen object 91 from different illumination directions. Here, the different illumination directions are implemented by different beam paths 112 of light (the beam paths 112 are illustrated by the dotted lines in FIG. 1).

The beam paths 112 of the light are produced by a light source unit 102. By way of example, the light source unit 102 could comprise a laser scanner which selectively emits light along one or more of the beam paths 112. In the example of FIG. 1, the light source unit 102, however, comprises a multiplicity of discrete light sources 111. Each of the light sources 111 of the multiplicity of light sources 111 can be individually activated and deactivated by a control unit (not illustrated in FIG. 1). As a result, it is possible to select between different illumination directions. By way of example, a corresponding control unit could be implemented by a processor, a microprocessor, a field programmable gate array (FPGA) or an application-specific integrated circuit (ASIC).

The beam paths 112 are formed by an optical unit 103 of the illumination module 101. What is achieved by means of the optical unit 103 is that the beam paths 112 are steered onto the specimen object 91 and the latter is illuminated therewith. The optical unit 103 can be implemented as a segmented optical unit 103 in the various examples described herein. This means that the optical unit 103 has individual segments, with different segments being assigned to different beam paths 112. A single beam path 112 can be shaped per segment; however, it would also be possible to shape more than one beam path 112 per segment. Hence, it is possible to match the individual segments particularly well to the respective requirements of the corresponding beam path or the corresponding beam paths 112. Particularly in comparison with a whole-area optical unit without segments, this allows accurate and low-complexity beam shaping of the beam paths 112 to be achieved.

In general, the beam paths 112 can each be configured for large-area illumination of the specimen object 91 or the specimen holder 95. This may mean that different beam paths 112 illuminate at least one common overlap region on the specimen holder 95 and do not illuminate complementary regions.

In the example of FIG. 1, the specimen holder 95, on which the specimen object 91 is arranged, is arranged between the illumination module 101 and the detector 82—i.e., in transmitted-light geometry. This means that the optical system 90 is configured for transmitted-light imaging. In other examples, the optical system 90 could also be configured for reflected-light imaging if the detector 82 and the illumination module 101 are arranged on the same side of the specimen holder 95, i.e., in reflected-light geometry. By way of example, a beam splitter could be used to this end, said beam splitter steering reflected light to the detector 82. This can avoid the illumination module 101 having to be designed as a ring illumination module because the detector 82 need not be arranged in the central hole of the ring illumination module.

It is further evident in the example of FIG. 1 that some of the beam paths 112 do not reach the detector 82 without being scattered at the specimen object 91; instead, these are blocked by the detector aperture 81, i.e., they are arranged in the dark field of the detector aperture 81. However, other beam paths 112 directly reach the detector 82 without being scattered at the specimen object 91; i.e., they are arranged in the bright field of the detector aperture 81. The arrangement of the beam paths 112 is thus configured both for bright-field imaging and dark-field imaging in the example of FIG. 1. This is achieved by virtue of light sources 111 also being arranged in the vicinity of the principal axis 93. Details will be described below in conjunction with FIG. 3.

Figure 2:
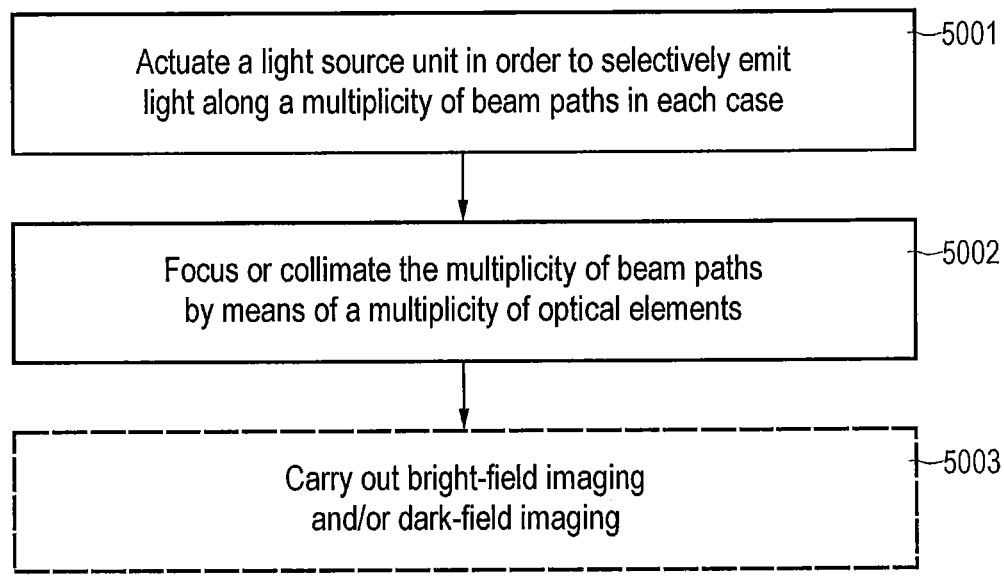
FIG. 2 is a flowchart of one exemplary method.

FIG. 2 is a flowchart of a method according to various examples. Initially, the light source unit 102 is actuated in step 5001. By way of example, the light source unit 102 could be actuated by the control unit. The light source unit 102 is actuated in order to selectively emit light along a multiplicity of beam paths 112 in each case, for example sequentially in time or overlapping in time. By way of example, corresponding control data could be transmitted to the light source unit 102, said control data indicating whether or not light should be emitted along the corresponding beam path 112 for each beam path of the multiplicity of beam paths 112. This means that individual beam paths can be switched individually.

What can be achieved by the individual switching of beam paths 112 is that certain illumination directions are implemented for the illumination of the specimen object 91. By way of example, the selection of the illumination direction can be made depending on the application based on the angle-resolved illumination. By way of example, different illumination directions/beam paths could be selected for applications relating to determining the position of the specimen object 91 than for applications relating to the production of a phase contrast image.

By way of example, a subset of all beam paths 112 could be activated, with the subset also being able to comprise only a single beam path 112.

Subsequently, the multiplicity of beam paths 112 are transformed, i.e., focused or collimated, for example, in step 5002. To this end, a multiplicity of optical elements are used, said optical elements implementing the segmented optical unit 103, for example.

The detector 82 is also actuated in the optional step 5003. Then, there is bright-field imaging and/or dark-field imaging—depending on the activated beam path or activated beam paths from step 5001.

Figure 3:
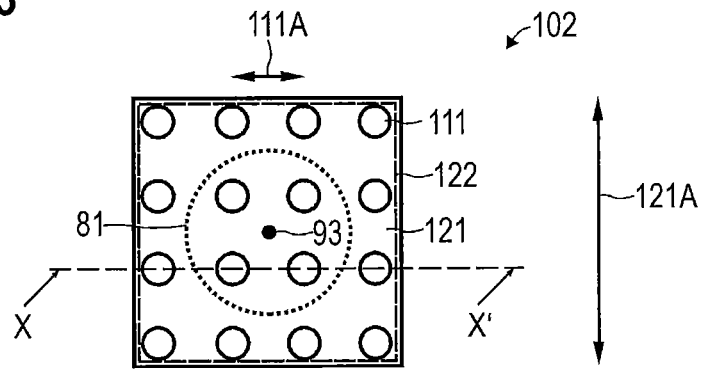
FIG. 3 schematically illustrates a light source unit of the illumination module according to various examples, wherein the light source unit has a multiplicity of light sources which are arranged on a carrier.

FIG. 3 illustrates aspects relating to the light source unit 102. The light source unit 102 has a carrier 121. By way of example, the carrier 121 could be implemented by a circuit board or a semiconductor substrate.

A plurality of light sources 111 are arranged on the carrier 121. The light sources 111 are arranged in a lattice structure in the example of FIG. 3. The lattice structure of the light sources 111 has a square unit cell, with other unit cells also becoming possible in other examples. By way of example, examples of unit cells comprise hexagonal unit cells, rectangular unit cells, octagonal unit cells, etc. Nor is it necessary, in general, for the light sources 111 to be arranged in a lattice structure. By way of example, the light sources 111 could also be arranged in circular or random fashion on the carrier 121.

By way of example, the light sources 111 could be implemented by fiber ends of fibers. Then, use could be made of one or more fiber-coupled lighting fixtures in order to feed light into the fibers. Alternatively, the light sources 111 could also be implemented directly by lighting fixtures assembled on the carrier 121, for example by light-emitting diodes, etc. The light sources 111 could also be provided in integrated fashion with the substrate, e.g., in the case of VCSELs.

In the example of FIG. 3, the light source unit 102 comprises a total of 4×4 light sources 111. However, in general, it would also be possible for the light source unit 102 to have a greater or smaller number of light sources. By way of example, the distance 111A between adjacent light sources could lie in the range of 5 mm to 50 mm. By way of example, the side length 121A of the region of the light source unit 102 occupied by light sources 111 could lie in the range of 50 mm to 200 mm. Using light source units 102 dimensioned in this way, it is possible to implement illumination directions that fill a solid angle with sufficiently large dimensions for typical applications of the angle-resolved illumination.

FIG. 3 illustrates a scenario in which the lateral real space density of the light sources 111 does not vary within a perimeter 122 of a region within which all light sources 121 are arranged (this perimeter 122 is labeled by the dashed line in FIG. 3): the distance between light sources that are closest neighbors is constant on account of the square unit cell.

Expressed differently, this means that no hole is provided in the carrier 121, within which light sources 111 would be lacking. In particular, no central hole is present; instead, light sources 111 are also arranged in the vicinity of the principal axis 93 of the corresponding optical system (coincident with a geometric center of the perimeter 122 in the example of FIG. 3).

In general, variations in the real space density of the light sources would also be possible within a perimeter of a region in which substantially all light sources 111 are arranged. By way of example, such a region can be defined by virtue of no less than 90% of all the light sources 111 being arranged within the perimeter of the region.

By way of example, the real space density within the perimeter of the region could vary by no more than 50%, optionally by no more than 20%, further optionally by no more than 5%. This can ensure flexible setting of different illumination directions without significant gaps, which may be desirable, for example in conjunction with certain applications of the angle-resolved illumination—for instance, autofocus techniques or phase contrast techniques. By way of example, various illumination directions lying close together can be implemented: this can be helpful if the position of the image of the specimen object is displaced depending on the illumination direction in order thus to restrict the variation in the position of the image.

Moreover, what this can achieve is at least some light sources 111 being present within an image of the detector aperture in the plane of the light sources 111 (this image of the detector aperture 81 by an objective optical unit is represented by the dotted line in FIG. 3). If some light sources 111 lie within the image of the detector aperture and other light sources 111 lie outside of the image of the detector aperture, the geometric arrangement of the corresponding beam paths is configured both for bright-field imaging of the microscope and for dark-field imaging of the microscope—depending on which corresponding beam path 112 is activated. It would be possible in some examples for only light sources 111 for bright-field imaging to be present, and no light sources 111 for dark-field imaging.

Figure 4:
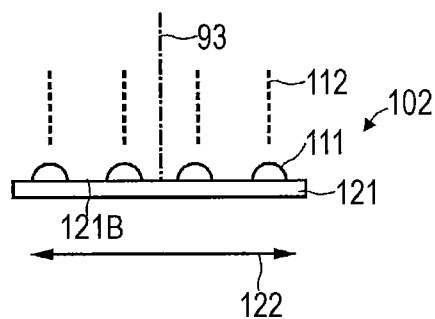
FIG. 4 is an exemplary sectional view of the light source unit according to the example of FIG. 3, wherein the carrier has a planar embodiment.

FIG. 4 illustrates aspects relating to the light source unit 102. FIG. 4 is an exemplary sectional view along the line X-X' of FIG. 3. The light sources 111 are arranged on a surface 121B of the carrier 121 in the example of FIG. 4. The surface 121B of the carrier 121 is planar, i.e., not curved. Since all of the light sources 111 are also oriented in the same way in relation to the surface 121B, the beam paths 112 of the light emitted by the light sources 111 are also all oriented parallel to one another and to the optical principal axis 93.

Figure 5:
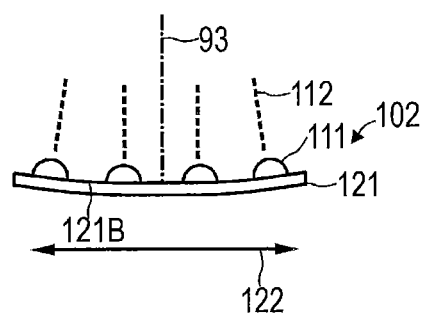
FIG. 5 is an exemplary sectional view of the light source unit according to the example of FIG. 3, wherein the carrier has a curved embodiment.

FIG. 5 illustrates aspects relating to the light source unit 102. FIG. 5 is an exemplary sectional view along the line X-X' of FIG. 3. Here, in principle, the example of FIG. 5 corresponds to the example of FIG. 4. However, the surface 121B of the carrier 121 is curved in the example of FIG. 5. However, the various light sources 111 all have the same orientation in respect of the surface 121B, for example along a surface normal (wherein the surface normal changes its orientation as a function of the position on the surface 121B on account of the curvature). The curvature of the surface 121B of the carrier 121 is oriented toward the optical principal axis 93. What can be achieved by such techniques is that the various beam paths 112 are already oriented in the direction of the specimen object 91. As a result, an additional deflection of the beam paths 112 by the segmented optical unit can be dispensed with, or at least require only smaller deflection angles.

Figure 6:
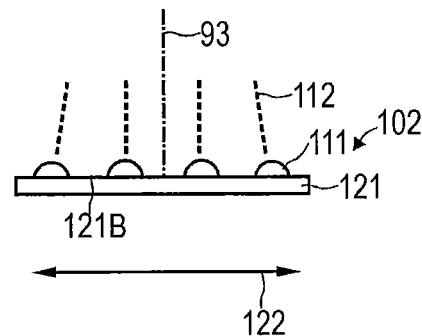
FIG. 6 is an exemplary sectional view of the light source unit according to the example of FIG. 3, wherein the light sources have a tilted arrangement in relation to a surface of the carrier.

FIG. 6 illustrates aspects relating to the light source unit 102. FIG. 6 is an exemplary sectional view along the line X-X' of FIG. 3. Here, in principle, the example of FIG. 6 corresponds to the example of FIG. 5. However, the surface 121B of the carrier 121 is planar and not curved in the example of FIG. 6. However, the various light sources 111 have different orientations in relation to the surface 121B. In particular, the light sources 111 are arranged on the surface 121B at different angles. By way of example, this can be achieved by tilted bores, in which the various light sources 111 are inserted. What can be achieved by such techniques, too, is that the various beam paths 112 are already oriented in the direction of the specimen object 91. As a result, an additional deflection of the beam paths 112 by the segmented optical unit can be dispensed with, or at least require only smaller deflection angles.

Figure 7:
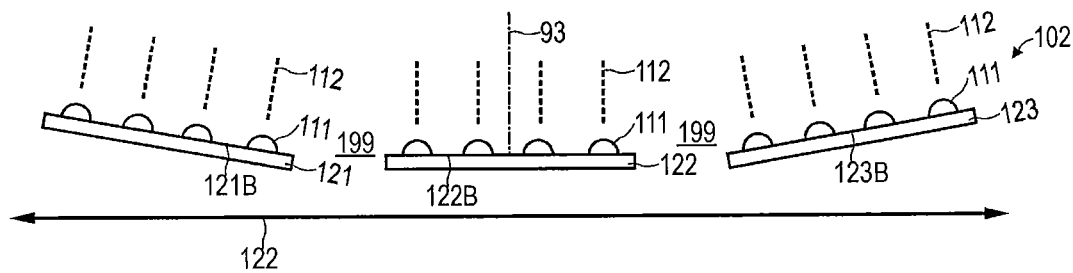
FIG. 7 is an exemplary side view of a light source unit, wherein the light source unit has a plurality of carriers, which are tilted in relation to one another, with respective light sources.

FIG. 7 illustrates aspects relating to the light source unit 102. FIG. 7 is an exemplary side view of a light source unit 102. The light source unit 102 according to the example of FIG. 7 also comprises a multiplicity of light sources 111. However, the light sources 111 are arranged on different carriers 121-123 in groups in this case. Here, each of the carriers 121-123 has a planar surface 121B-123B; however, the surfaces 121B-123B are arranged at different angles. What can be achieved by such techniques, too, is that the various beam paths 112 are already oriented in the direction of the specimen object 91. As a result, an additional deflection of the beam paths 112 by the segmented optical unit can be dispensed with, or at least require only smaller deflection angles.

The techniques illustrated above with reference to FIGS. 5 and 6 and 7 can also be combined with one another in different examples. In this way, particularly large angles can be obtained between the various beam paths 112.

Figure 8:
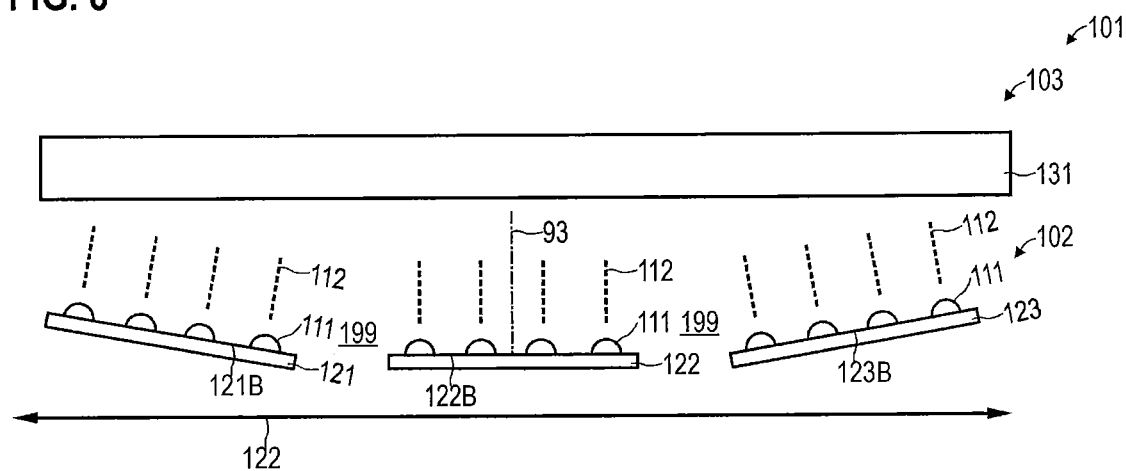
FIG. 8 is an exemplary side view of a light source unit with an assigned segmented optical unit with an integral embodiment, wherein the light source unit has a plurality of carriers, which are tilted in relation to one another, with respective light sources.

FIG. 8 illustrates aspects in relation to the relative arrangement of the light source unit 102 with respect to the segmented optical unit 103 (the individual segments of the segmented optical unit 103 are not illustrated in the example of FIG. 8 for reasons of simplicity).

In the example of FIG. 8, the segmented optical unit 103 is embodied as an integral part 131. By way of example, surfaces of the integral part could have a structure such that, as a result thereof, a multiplicity of optical elements, which are each assigned to different beam paths 112, are defined (not shown in FIG. 8).

In the example of FIG. 8, the integral part 131 is associated with the various beam paths 112 belonging to light sources 111 arranged on different carriers 121-123. This means that the integral part 131 has comparatively large dimensions, in particular larger than the various carriers 121-123.

Figure 9:
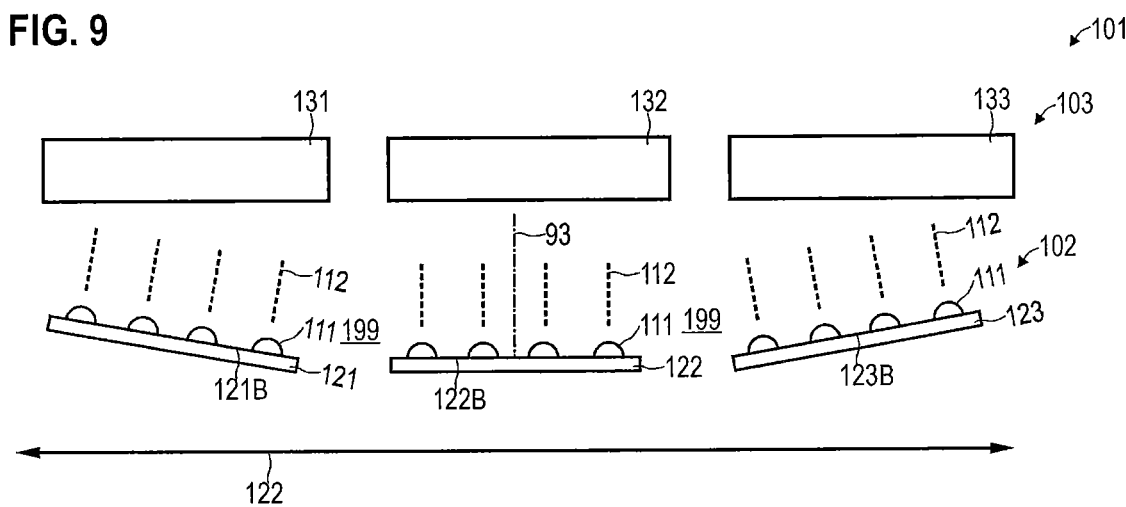
FIG. 9 is an exemplary side view of a light source unit with a plurality of assigned segmented optical units, each with an integral embodiment, wherein the light source unit has a plurality of carriers, which are tilted in relation to one another, with respective light sources, different carriers being assigned to different segmented optical units.

FIG. 9 illustrates aspects in relation to the relative arrangement of the light source unit 102 with respect to the segmented optical unit 103. Here, in principle, the example of FIG. 9 corresponds to the example of FIG. 8. However, the segmented optical unit 103 comprises a plurality of integral parts 131-133 in the example of FIG. 9. By way of example, surfaces of the integral parts 131-133 could have a structure such that, as a result thereof, a multiplicity of optical elements are respectively defined per integral part 131-133 (not illustrated in FIG. 9). Then, the different optical elements can be assigned to different beam paths 112.

In the example of FIG. 9, the light sources 111 arranged at the surfaces 121A-121C of different carriers 121-123 are associated with optical elements that are assigned to different integral parts 131-133. As a result, the individual integral parts 131-133 can have smaller dimensions and can be better adapted to the respective requirements of the different beam paths 112.

Small holes 199, in which no light sources 111 are arranged, are in each case present between the carriers 121-123 in FIGS. 7-9. However, these holes have particularly small dimensions in the various examples described herein: by way of example, the lateral real space density of the light sources 111 may vary by no more than 50% within the perimeter 122. By way of example, in FIGS. 7-9, the distance between light sources 111 that are closest neighbors on different carriers 121-123 in the region of the holes 199 is approximately twice the size of outside of the region of the holes 199. In the case of FIGS. 7-9, too, the holes 199 are not used to steer light to the detector 81.

Figure 10:
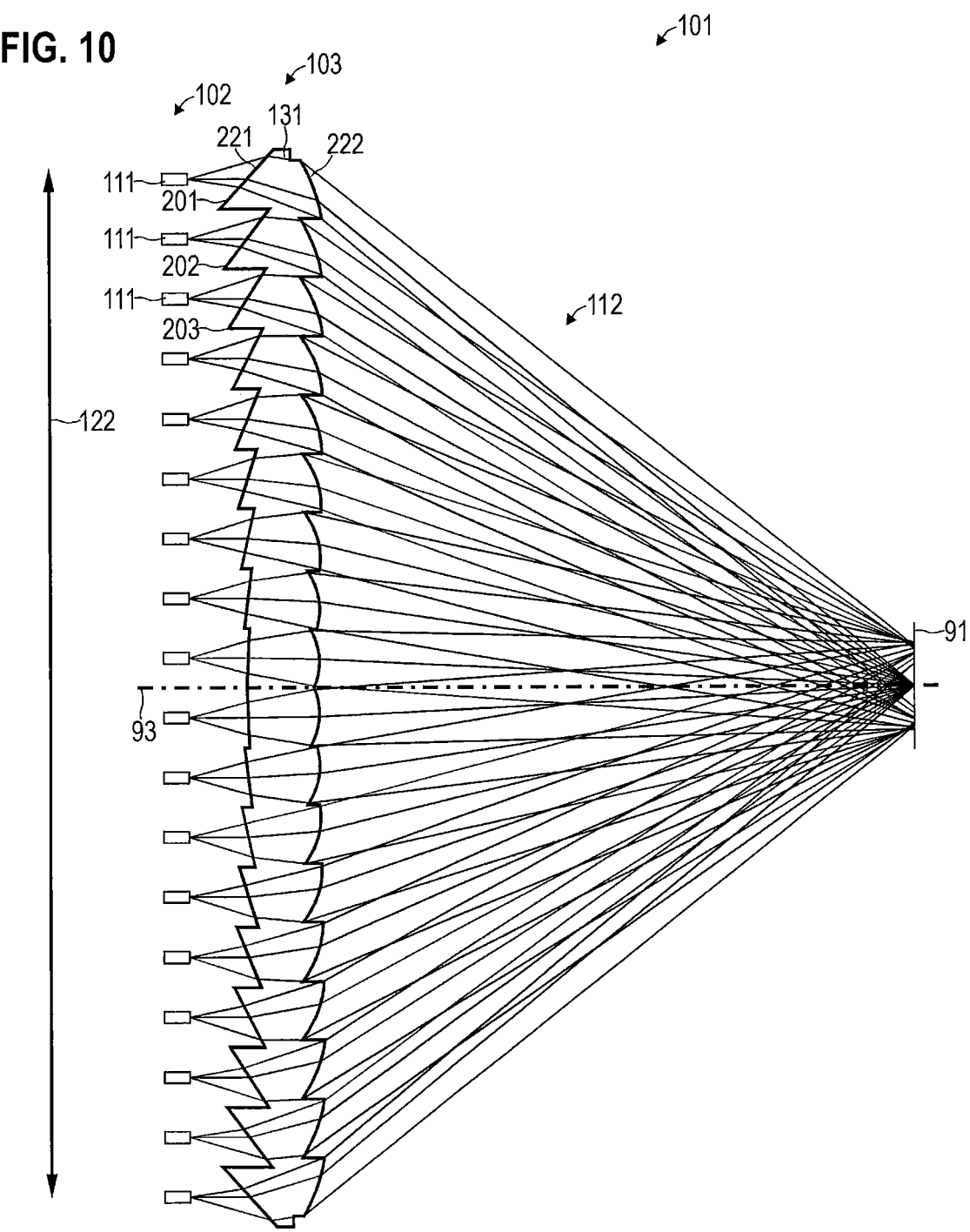
FIG. 10 is an exemplary side view of a light source unit and a segmented optical unit with an integral embodiment, wherein the optical unit forms a lens array and a prism array.

FIG. 10 illustrates aspects relating to the shaping of beam paths 112. Furthermore, FIG. 10 illustrates aspects relating to the segmented optical unit 103.

In the example of FIG. 10, the segmented optical unit 103 is embodied as an integral part 131. By way of example, the integral part 131 could be manufactured from glass or plastics. Exemplary materials include Luxexcel Opticlear™, polycarbonate, PMMA, etc.

The segmented optical unit 103 implements a multiplicity of optical elements 201-203 (not all optical elements have been provided with reference signs in FIG. 10 for reasons of simplicity). The optical elements 201-203 are laterally offset from one another, i.e., perpendicular to the optical principal axis 93 and also to the central rays of the beam paths 112 near the light sources 111. Each optical element 201-203 is assigned to a certain beam path 112 or a certain light source 111 in the example of FIG. 10. The optical element 201-203 transforms the corresponding beam path 112 such that the divergence is reduced but is maintained as a matter of principle. In other examples, the optical element 201-203 could also implement a collimation of the corresponding beam path 112 or obtain a convergent beam path.

What can be achieved by this beam shaping is that the specimen object 91 is illuminated in suitable fashion, even if the latter has typical lateral extents (vertical direction in FIG. 10) in the range of 1-10 mm. In particular, a particularly high etendue can be obtained in the region of the specimen object 91.

By virtue of using different optical elements 201-203 for different beam paths 112, it is possible to avoid the use of a particularly complicated, expensive and difficult-to-produce whole-area optical unit.

In the example of FIG. 10, the structured optical unit 103 is further configured to deflect the beam paths 112. Thus, in particular, at least some of the optical elements 201-203 are configured to deflect the corresponding beam path 112. Here, the beam paths 112 are each deflected in the direction of the optical principal axis 93 or in the direction of the specimen object 91.

This functionality of beam shaping and deflection is achieved by the suitable shape of the surfaces 221, 222 of the integral part 131. By way of example, the surfaces 222 implement a lens array with a plurality of lenses. Here, different lenses of this lens array are in turn assigned to different beam paths 112. The surfaces 221 implement a prism array with a plurality of prisms. Here, different prisms of the prism array are in turn assigned to different beam paths 112. The lens array implements the beam shaping; the prism array implements the deflection.

Figure 11:
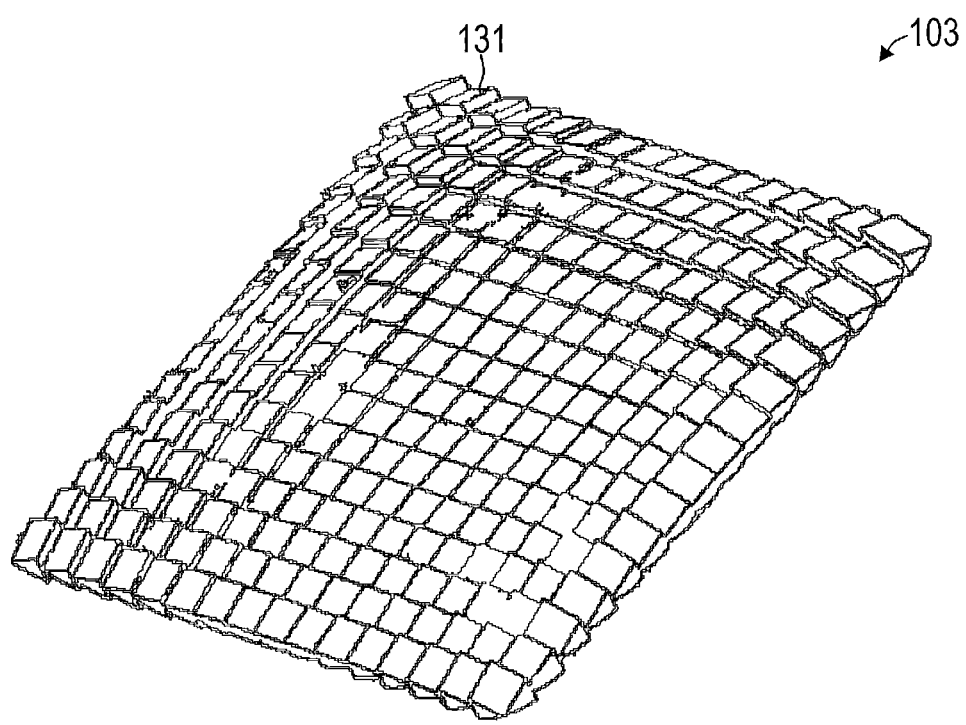
FIG. 11 is a perspective view of the segmented optical unit according to the example of FIG. 10.

FIG. 11 is a perspective view of the integral part 131 of the segmented optical unit 103 according to the example of FIG. 10. FIG. 11 illustrates the surface 221, which implements a prism array.

It is evident from FIGS. 10 and 11 that the different optical elements 201-203 each implement different beam shaping and a different deflection of the corresponding beam path 112. By way of example, focusing with a longer focal length is implemented for those optical elements 201-203 that are arranged at a greater distance from the optical principal axis 93 (top and bottom in FIG. 10), i.e., a stronger divergence could be present; this compensates the greater distance from the specimen object 91. Moreover, there is a deflection with a greater deflection angle for those optical elements 201-203 that are arranged at a greater distance from the optical principal axis three 90 (top and bottom in FIG. 10); this compensates the greater distance from the optical principal axis 93. This is expressed by a variation in the surface geometry of the surfaces 221, 222 of the optical elements 201-203.

It is evident from FIG. 11 that the various optical elements 201-203 are arranged in a lattice structure with a square unit cell. By way of example, this lattice structure can correlate with the lattice structure of the light sources 111 of the light source unit 102. These may also be arranged with a square unit cell in the example of FIG. 11. What this achieves is that as much light as possible falls into the respective aperture of the corresponding optical element 201-203.

Figure 12:
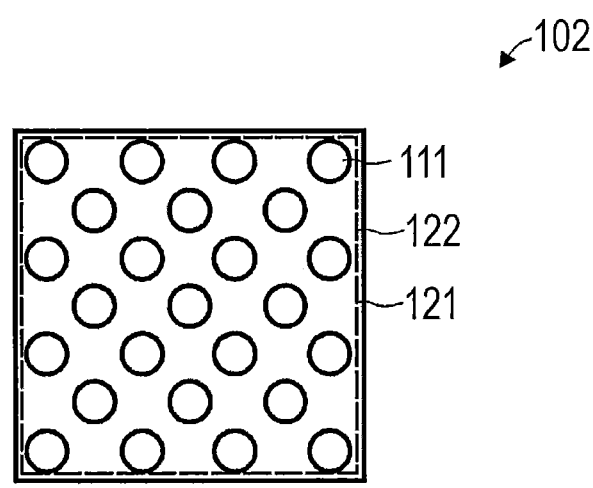
FIG. 12 schematically illustrates a light source unit of the illumination module according to various examples, wherein the light source unit has a multiplicity of light sources which are arranged on a carrier.

Other shapes of the unit cell also become possible. By way of example, FIG. 12 illustrates a rotated square unit cell for the lattice of the light sources 111. Other examples comprise: a hexagonal unit cell; an octagonal unit cell; a rectangular unit cell; and a square unit cell.

Figure 13:
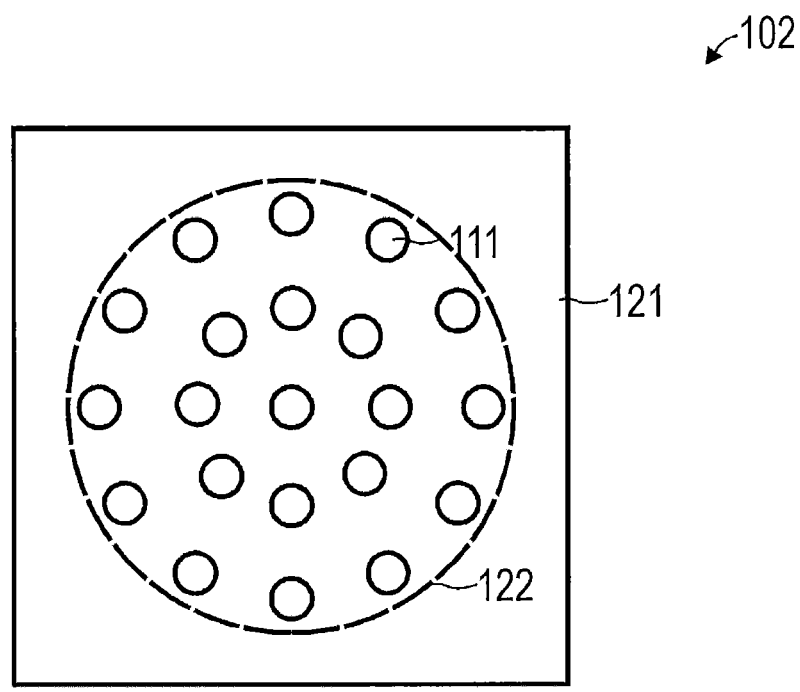
FIG. 13 schematically illustrates a light source unit of the illumination module according to various examples, wherein the light source unit has a multiplicity of light sources which are arranged on a carrier.

The light sources 111 being arranged in a lattice structure can be dispensed with in other examples. Thus, FIG. 13 illustrates an example in which the light sources 111 are arranged in ring-shaped fashion. By way of example, such an example could be combined with a segmented optical unit 103, which is implemented as a Fresnel lens.

Figure 14:
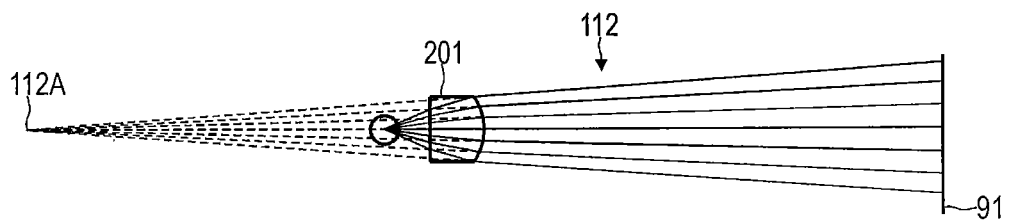

FIG. 14 illustrates aspects relating to the beam shaping of the beam path 112 by an optical element 201. In particular, FIG. 14 illustrates focusing of the beam path 112 with a positive focal length; a residual divergence remains even after the transformation. What this can achieve is illuminating a region of the specimen object 91 that is larger than the aperture of the optical element 201.

In such a scenario, in particular, it may be possible for an overlap region of the specimen object to be able to be illuminated by the various beam paths 112. As a result, a large-area illumination of the specimen object can be facilitated, which may be helpful, in particular, in conjunction with phase contrast imaging or autofocus applications in conjunction with the angle-resolved illumination. Such a large-area illumination of the specimen object can also be obtained in other variants of the beam shaping, depending on the characteristic exhibited by the beam path 112 emanating from the light sources 111.

Figure 15:
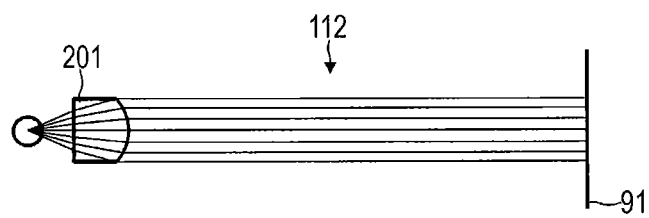

FIG. 15 illustrates aspects relating to the beam shaping of the beam path 112 by an optical element 201. In particular, FIG. 15 illustrates the collimation of the beam path 112. What this can achieve is illuminating a region of the specimen object 91 that is as large as the aperture of the optical element 201. What may, under certain circumstances, need to be taken into account here is the projection into the plane perpendicular to the beam path in the case of an illumination from an oblique direction.

Figure 16:
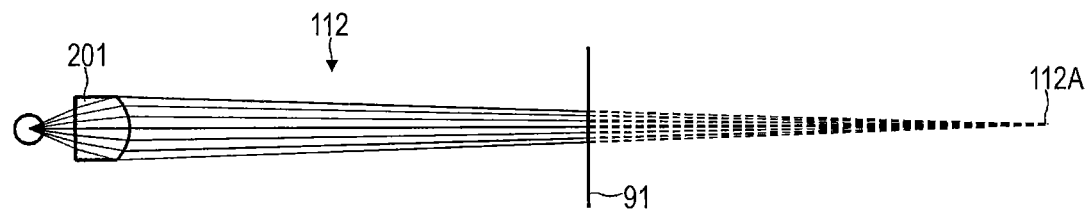

FIG. 16 illustrates aspects relating to the beam shaping of the beam path 112 by an optical element 201. In particular, FIG. 16 illustrates the focusing of the beam path 112 with a positive focal length. What this can achieve is illuminating a region of the specimen object 91 that is smaller than the aperture of the optical element 201.

A suitable embodiment of the multiplicity of optical elements 201-203 allows the different variants of the beam shaping to be matched to the requirements of the corresponding optical apparatus 90.

Figure 17:
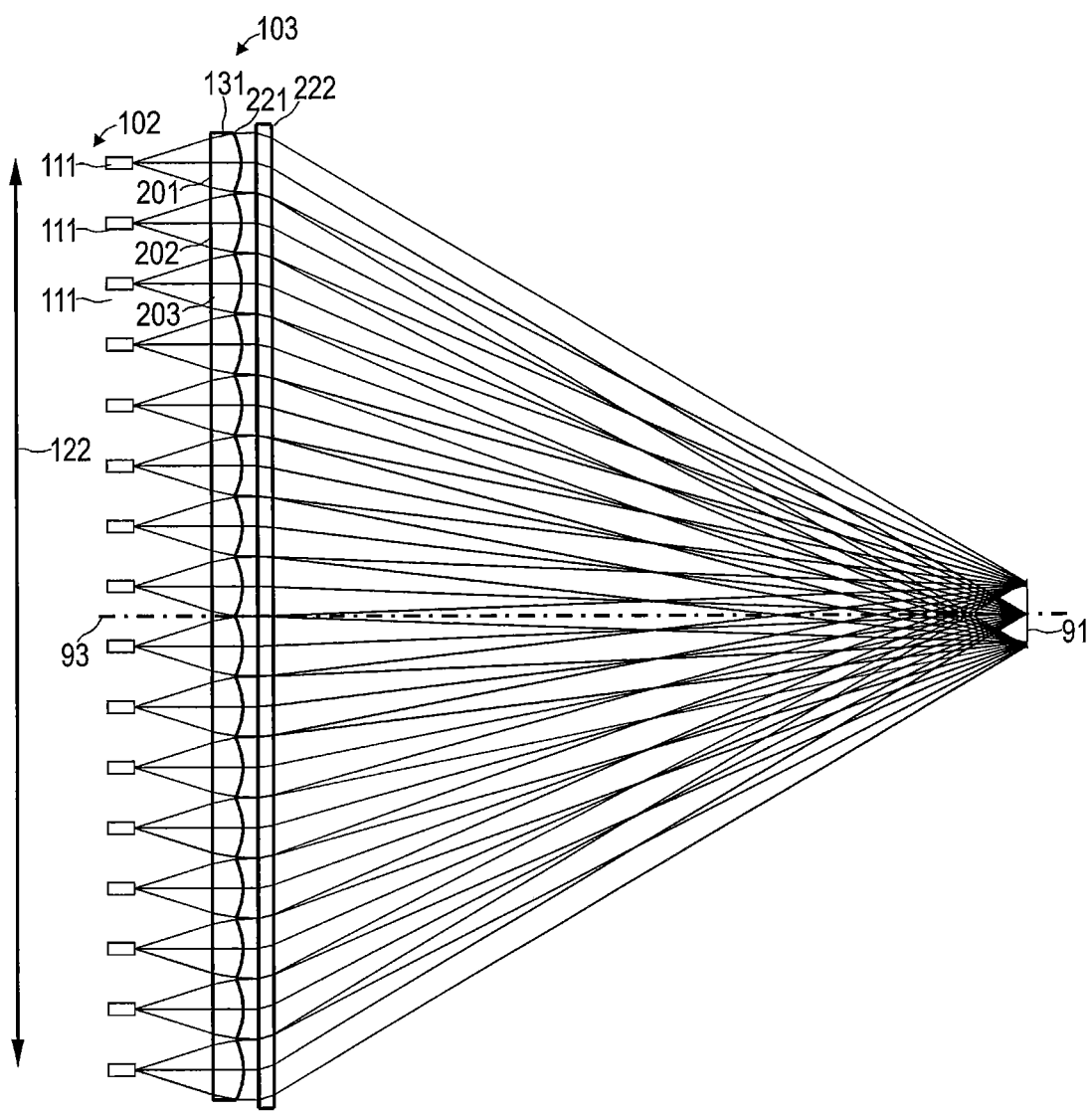
FIG. 17 is an exemplary side view of a light source unit and a segmented optical unit with an integral embodiment, wherein the optical unit forms a lens array.

FIG. 17 illustrates aspects relating to the shaping of beam paths 112. Furthermore, FIG. 17 illustrates aspects relating to the segmented optical unit 103. In the example of FIG. 17, the segmented optical unit 103 comprises a lens array that is formed by the surface 221 of the integral part 131. Moreover, the segmented optical unit 103 comprises a Fresnel lens, which is embodied as a whole-area lens, i.e., which shapes a multiplicity of beam paths 112. The Fresnel lens comprises ring zones, with different ring zones being assigned to different beam paths 112 (the ring zones are not illustrated in FIG. 17).

It is evident from FIG. 17 that the segmented optical unit may, in general, also comprise optical components that are arranged in spaced apart fashion along the optical principal axis 93.

By way of example, a Fresnel lens as a whole-area lens could be combined with further optical elements in some examples. By way of example, it would be possible for a multiplicity of light sources of the light source unit to be arranged on a carrier; furthermore, a plurality of optical elements can be coupled to the carrier. By way of example, an optical element coupled to the carrier, such as a converging lens for reducing the divergence, for example, could be provided for each light source unit. Then, the Fresnel lens can be arranged at a certain distance therefrom.

Figure 18:
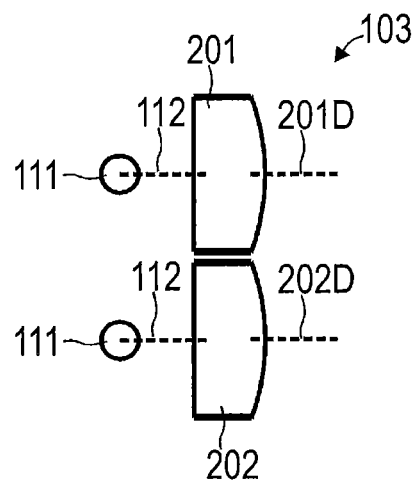
FIG. 18 schematically illustrates the assignment between light sources of a light source unit and optical elements of a segmented optical unit according to various examples, wherein the optical elements are arranged in centric fashion in relation to a central ray of a corresponding beam path of the light sources in the example of FIG. 19.

FIG. 18 illustrates aspects relating to assignment of the beam paths 112 to optical elements 201, 202. A single beam path 112 is assigned to each optical element 201, 202 in the example of FIG. 18.

FIG. 18 further illustrates that central axes 201D, 202D of the optical elements 201, 202 extend parallel to the central rays of the corresponding beam path 112 and are aligned in relation thereto (the central rays of the beam paths 112 are each illustrated using the dotted lines in FIG. 18). This means that the optical elements 201, 202 are arranged in centric fashion in relation to the central ray of the corresponding beam path 112.

Further, the segmented optical unit does not have an integral embodiment in the example of FIG. 18. By way of example, the various optical elements 201, 202 could be affixed relative to one another by way of a frame.

Figure 19:
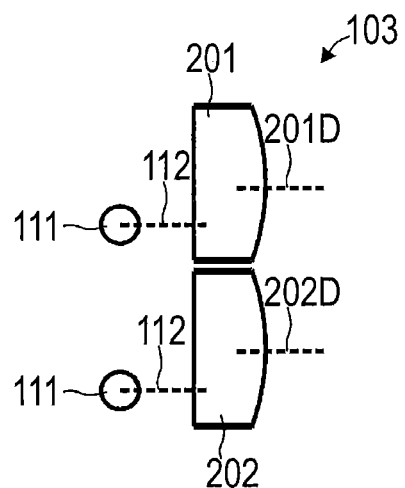
FIG. 19 schematically illustrates the assignment between light sources of a light source unit and optical elements of a segmented optical unit according to various examples, wherein the optical elements are arranged in acentric fashion in relation to a central ray of a corresponding beam path of the light sources in the example of FIG. 19.

FIG. 19 illustrates aspects relating to the assignment of beam paths 112 to optical elements 201, 202. Here, in principle, the example of FIG. 19 corresponds to the example of FIG. 18. However, the optical elements 201, 202 in the example of FIG. 19 each are arranged in acentric fashion in relation to the central ray of the corresponding beam path 112 (corresponding circumstances are also evident from FIG. 10, where the acentricity increases for greater distances from the axis 93). A particularly high etendue can be obtained by such techniques. By way of example (also referring to the example of FIG. 10), a displacement of the respective central axis in 201D, 202D could thus be achieved between front side 221 and back side 222 in the case of a suitable embodiment of the various surfaces 221, 222 of the optical elements 201-203. As a result, it is possible to take account of the beam deflection on account of the prism 221 embodied by the front side 201 20. Then, less light is lost.

Figure 20:
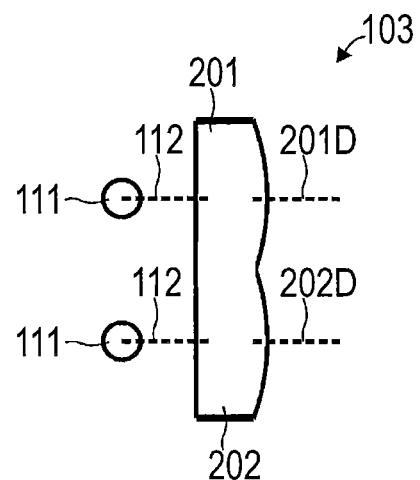
FIG. 20 schematically illustrates the assignment between light sources of a light source unit and optical elements of a segmented optical unit according to various examples.

FIG. 20 illustrates aspects relating to the assignment of beam paths 112 to optical elements 201, 202. Here, in principle, the example of FIG. 20 corresponds to the example of FIG. 18. However, the optical elements 201, 202 have an integral embodiment in the example of FIG. 20. By way of example, the implementation of FIG. 20 could also be combined with implementation of FIG. 19.

Figure 21:
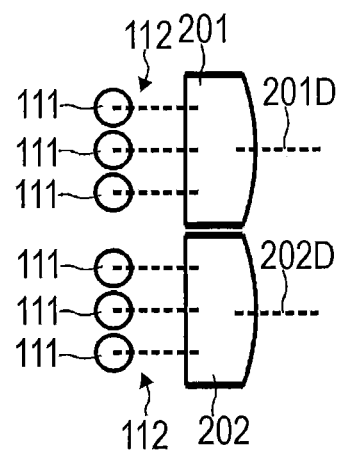
FIG. 21 schematically illustrates the assignment between light sources of a light source unit and optical elements of a segmented optical unit according to various examples, wherein three light sources are assigned to one optical element in the example of FIG. 21.

FIG. 21 illustrates aspects relating to the assignment of beam paths 112 to optical elements 201, 202. Here, in principle, the example of FIG. 21 corresponds to the example of FIG. 18. However, respectively three beam paths 112 are assigned to a single optical element 201, 202 in the example of FIG. 21. By way of example, the light sources 111 associated with a common optical element 201, 202 could be integrated on a common semiconductor substrate. By way of example, the light sources 111 associated with a common optical element 201, 202 could emit light with different colors, for example red, green and blue. The light sources 111 could form a lighting fixture as a 3-chip light-emitting diode.

Figure 22:
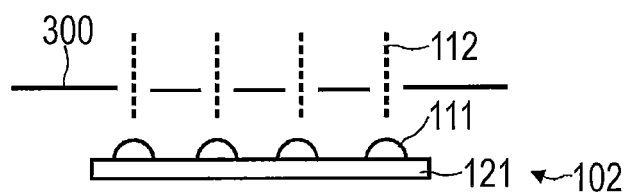
FIG. 22 schematically illustrates a multiplicity of field stops, which are arranged adjacent to light sources of a light source unit.

FIG. 22 illustrates aspects relating to a stop unit 300. The stop unit 300 implements a multiplicity of field stops, with different field stops being assigned to different beam paths 112. The stop unit 300 is arranged adjacent to the light source unit 102 or the light sources 111 in the example of FIG. 22. As a result, the divergent propagation of the light near to the light sources 111 can be suppressed and crosstalk between different beam paths 112 can be avoided. By way of example, the stop unit 300 could also be arranged behind the segmented optical unit 103 in other examples.

It goes without saying that the features of the embodiments and aspects of the invention described above can be combined with one another. In particular, the features can be used not only in the combinations described but also in other combinations or on their own without departing from the scope of the invention.

The invention claimed is:

1. An illumination module for a microscope, comprising:
a light source unit, which is configured to selectively emit light along a multiplicity of beam paths, such that each beam path of the multiplicity of beam paths is configured to be switched individually, wherein the multiplicity of beam paths comprise light-optical beam paths, and
a multiplicity of optical elements arranged with lateral offset from one another, wherein each optical element of the multiplicity of optical elements is configured to transform at least one corresponding beam path of the multiplicity of beam paths such that all of the light-optical beam paths illuminate a specimen holder of the microscope in a joint overlap area,
wherein different ones of the light-optical beam paths associated with each optical element illuminate the specimen holder at different illumination angles,
wherein the light source unit comprises at least one carrier and a multiplicity of separately actuatable light sources attached to the at least one carrier,
wherein respective ones of the light sources of the multiplicity of light sources are configured to selectively emit light along a corresponding light-optical beam path of the multiplicity of beam paths, and
wherein a real space density of the light sources varies by no more than 50% within a perimeter of a region of the at least one carrier, in which no fewer than 90% of all of the light sources lie.

2. The illumination module as claimed in claim 1, wherein at least some optical elements of the multiplicity of optical elements are configured to deflect the corresponding at least one beam path.

3. The illumination module as claimed in claim 1, wherein the multiplicity of optical elements forms a prism array with a plurality of prisms, and
wherein different prisms of the prism array are assigned to different beam paths.

4. The illumination module as claimed in claim 1, wherein the multiplicity of optical elements forms a lens array with a plurality of lenses, and
wherein different lenses of the lens array are assigned to different beam paths.

5. The illumination module as claimed in claim 1, further comprising:
a whole-area lens arranged in front of or behind the multiplicity of optical elements in the multiplicity of beam paths,
wherein the whole-area lens comprises a Fresnel lens having a plurality of ring zones, and
wherein different ring zones are assigned to different beam paths of the multiplicity of beam paths.

6. The illumination module as claimed in claim 1, wherein the light sources are arranged on the surface of the at least one carrier,
wherein the surface of the at least one carrier is curved, or
wherein the light sources are arranged on the surface of the at least one carrier at different angles.

7. The illumination module as claimed in claim 1, wherein at least some optical elements of the multiplicity of optical elements are embodied as an integral part.

8. The illumination module as claimed in claim 1, further comprising:
a multiplicity of field stops which are assigned to different beam paths of the multiplicity of beam paths.

9. The illumination module as claimed in claim 1, wherein at least some optical elements of the multiplicity of optical elements are arranged in acentric fashion with respect to a central ray of the corresponding at least one beam path.

10. The illumination module as claimed in claim 1, wherein the multiplicity of light sources form a lattice structure, and
wherein the multiplicity of optical elements form a lattice structure, which corresponds to the lattice structure formed by the multiplicity of light sources.

11. The illumination module as claimed in claim 1, wherein at least some optical elements of the multiplicity of optical elements focus at least some beam paths of the multiplicity of beam paths with a residual divergence.

12. The illumination module as claimed in claim 1, wherein different optical elements of the multiplicity of optical elements effect at least one of different beam shaping of the corresponding at least one beam path, or focusing with different focal lengths.

13. The illumination module as claimed in claim 12, wherein those optical elements of the multiplicity of optical elements that have a greater distance from a principal axis of the microscope effect focusing with a longer or shorter focal length than those optical elements of the multiplicity of optical elements that have a shorter distance from the optical principal axis.

14. The illumination module as claimed in claim 1, wherein the light sources of the light source unit are implemented by a four-quadrant light-emitting diode unit.

15. The illumination module as claimed in claim 1, further comprising:
a condenser optical unit,
wherein the multiplicity of optical elements are arranged between the light source unit and the condenser optical unit.

16. A microscope comprising the illumination module as claimed in claim 1,
wherein a geometric arrangement of at least one beam path of the multiplicity of beam paths is configured for bright-field imaging of the microscope.

17. A microscope comprising:
an illumination module comprising:
a light source unit, which is configured to selectively emit light along a multiplicity of beam paths, such that each beam path of the multiplicity of beam paths is configured to be switched individually, wherein the multiplicity of beam paths comprise light-optical beam paths, and a multiplicity of optical elements arranged with lateral offset from one another, wherein each optical element of the multiplicity of optical elements is configured to transform at least one corresponding beam path of the multiplicity of beam paths such that all of the light-optical beam paths illuminate a specimen holder of the microscope in a joint overlap area, wherein different ones of the light-optical beam paths associated with each optical element illuminate the specimen holder at different illumination angles, wherein a geometric arrangement of at least one beam path of the multiplicity of beam paths is configured for bright-field imaging of the microscope, wherein the light source unit comprises at least one carrier and a multiplicity of separately actuatable light sources attached to the at least one carrier, wherein a real space density of the light sources varies by no more than 50% within a perimeter of a region of the at least one carrier, in which no fewer than 90% of all of the light sources lie.

18. The microscope as claimed in claim 17,
wherein a geometric arrangement of at least one further beam path of the multiplicity of beam paths is configured for dark-field imaging of the microscope.

19. The microscope as claimed in claim 17, further comprising:
a detector and
a specimen holder,
wherein the beam paths of the multiplicity of beam paths are arranged to illuminate a common overlap region on the specimen holder.

20. A method for operating a microscope, said method comprising:
actuating a light source unit of an illumination module of the microscope in order to selectively emit light along a multiplicity of beam paths in each case, such that each beam path of the multiplicity of beam paths is configured to be switched individually, wherein the multiplicity of beam paths comprise light-optical beam paths, transforming the multiplicity of beam paths by a multiplicity of optical elements of the illumination module arranged with lateral offset from one another, wherein each optical element of the multiplicity of optical elements is configured to transform at least one corresponding beam path of the multiplicity of beam paths such that all of the light-optical beam paths illuminate a specimen holder of the microscope in a joint overlap area, wherein different ones of the light-optical beam paths associated with each optical element illuminate the specimen holder at different illumination angles, and actuating a detector of the microscope to carry out imaging by means of the light emitted along at least one beam path of the multiplicity of light-optical beam paths, wherein the light source unit is actuated for bright-field imaging of the detector.

21. The method as claimed in claim 20,
wherein the light source unit is further actuated for dark-field imaging of the detector.

* * * * *